United States Patent
Eaton

[11] 3,991,972
[45] Nov. 16, 1976

[54] ELECTRICALLY OPERATED PROPORTIONATE VALVE

[75] Inventor: Thomas Eaton, Hawthorne, Calif.

[73] Assignee: ITL Technology Inc., Hawthorne, Calif.

[22] Filed: Apr. 21, 1975

[21] Appl. No.: 569,597

[52] U.S. Cl. ............................. 251/11; 251/7; 251/9
[51] Int. Cl.² .................... F16K 7/06; F16K 31/02
[58] Field of Search ..................... 251/11, 9, 4, 7

[56] References Cited
UNITED STATES PATENTS

| | | | |
|---|---|---|---|
| 2,660,395 | 11/1953 | Mair et al. | 251/7 X |
| 2,674,435 | 4/1954 | Angell | 251/7 |
| 2,946,489 | 7/1960 | Brucken | 251/11 X |
| 3,215,396 | 11/1965 | Bergsma | 251/11 |
| 3,335,753 | 8/1967 | Kiser | 251/9 X |

FOREIGN PATENTS OR APPLICATIONS

| 90,186 | 2/1959 | Netherlands | 251/7 |
|---|---|---|---|

*Primary Examiner*—Arnold Rosenthal
*Attorney, Agent, or Firm*—Edward H. Loveman

[57] ABSTRACT

A valve assembly having a passage therethrough for passing a fluid. Has a movable member adapted for variably constricting the passage in proportion to an applied voltage. The assembly includes an expansible electrical heater connected to the movable member which keeps the passage constricted. The wire expands upon passage of electric current therethrough to slacken whereupon, a bias means connected to the movable member acts thereupon to open the passage.

3 Claims, 10 Drawing Figures

ELECTRICALLY OPERATED PROPORTIONATE VALVE

This invention relates to the art of electrically operated valves, and more particularly concerns a valve for controlling the flow of fluid proportionately responsive to the magnitude of an applied signal voltage.

Electrically operated valves heretofore have generally employed solenoids which turn or move a valve element to vary control of fluid such as liquid or gas through the valve. The valve element is generally contacted by the fluid. This causes a number of difficulties. When the fluid is a gas, leakage develops as the movable valve element wears. When the fluid is a liquid, the valve element and associated parts are subject to corrosion. Cleaning requires disassembly of the valve. In addition to these objections such valves are complicated in structure, dimensional tolerances are close and critical, and the valves are expensive to manufacture.

The present invention is directed at overcoming the above and other difficulties and disadvantages of such prior electrically operated proportionate valves. According to the invention there is provided an angularly rotatable valve element connected to a taut, tensioned, expansible, electrically heatable wire. The valve element is biased to close a passage through which a fluid flows. When the wire is heated, it expands and slackens and the valve element is moved by the bias means to open the passage.

In one form of the invention, the movable valve element is a pivotable arm having a finger which extends radially into a passage in a valve body. The passage may be lined with an elastic member or membrance which serves as the bias means to retract the finger for opening the valve when the heatable wire expands.

In another form of the invention, the movable valve element is a disk disposed between two stationary disks having alinged apertures. The movable disk has an aperture which is normally biased out of alignment with the apertures in the fixed disks. When the heater wire expands, the bias means i.e. a spring, which is attached to or engaging the movable disk turns the disk until its aperture is aligned with the apertures in the fixed disks.

It is, therefore, a principal object of the present invention to provide a valve controllable by an expansible, electrical heater wire and a bias means.

Another object of the present invention is to provide a valve having a movable element arranged to control flow of fluid through a passage, which element is normally biased to a closed position by a taut, expansible electrical heater wire, and which element moves to open the valve in response to the bias when the heater wire expands and slackens.

These and other objects and many of the attendant advantages of this invention will be readily appreciated as the same becomes better understood by reference to the following detailed description when considered in connection with the accompanying drawings in which:

FIG. 1 is a plan view of a valve assembly embodying the invention, shown in closed position;

FIGS. 2, 3 and 4 are cross sectional views taken along lines 2—2, 3—3 and 4—4 respectively of FIG. 1';

Figure 1:
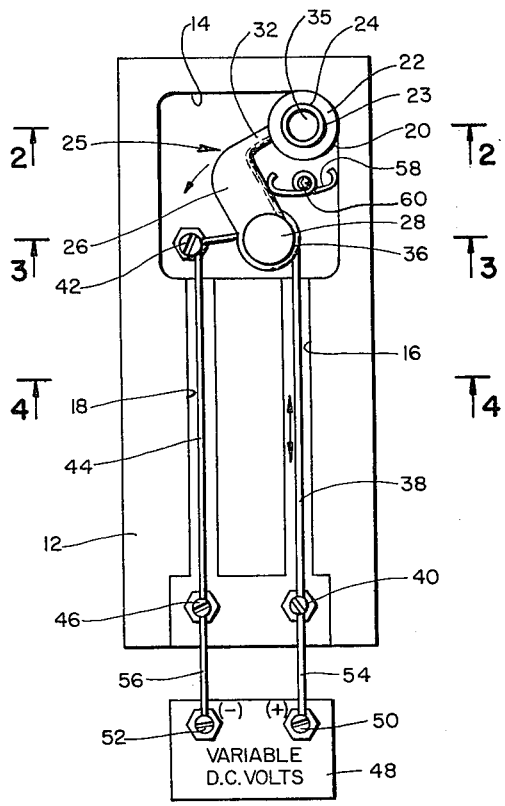
Figure 4:
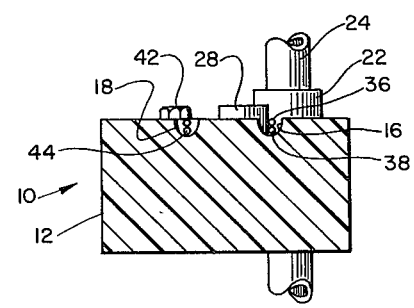

Referring now to the drawings, wherein like reference characters designate like or corresponding parts throughout, there is illustrated in FIGS. 1–5, a valve assembly generally designated as reference numeral 10, which includes a base plate 12 made of insulative material such as hard rubber bakelite or some other dimensionally stable material i.e. plastic. The plate 12 is formed with a generally rectangular recess 14 and two parallel grooves 16, 18 communicating at one end with the recess 14. The plate 12 is further formed with a cylindrical bore 20 which extends therethrough. In the bore 20 is fitted a short, rigid, cylindrical plastic sleeve 22 with an elastic tube 24 extending axially through a passage 23 in the sleeve 22.

Figure 2:
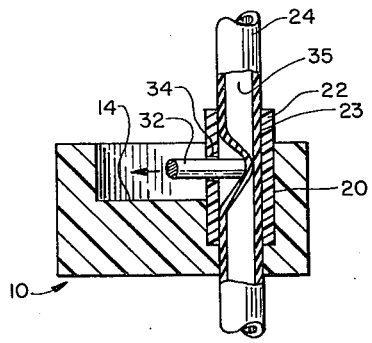
Figure 3:
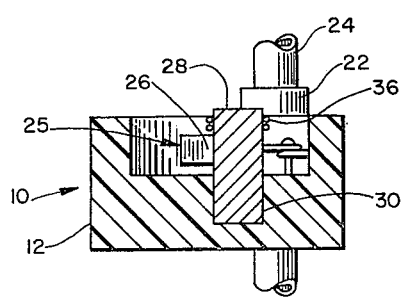

A movable element 25 of the valve assembly 10 includes an arm 26 which may be integral with a short vertical shaft 28 angularly rotatable in a bore 30 formed in the recess 14 and spaced laterally from the bore 20 (see FIG. 3). At the free end of the arm 26 is a finger 32. The arm 26 extends radially of the shaft 28 and the finger 32 extends angularly to and coplanar with the arm 26. The finger 32 extends through a hole 34 formed in the side of the sleeve 22 (see FIG. 2) to compress the tube 24 laterally and constrict or close the passage 23 in the sleeve 22.

Engaged on the shaft 28 is a coiled end 36 of a taut expansible electrical heater wire 38 made of nickel chrome or an equivalent alloy or metal. The other end of the wire 38 is secured to a set screw or a binding post 40 at one end of the groove 16 which supports the wire 38 extending therein. The coiled end 36 of the wire 38 is secured to a set screw or binding post 42 spaced laterally from the shaft 28. An electrically conductive wire 44 is connected to the post 42 and extends along the groove 18. The wire 44 is connected to a set screw or binding post 46 at the other end of the groove 18. A source 48 of variable D.C. voltage may be connected to wires 38 and 44. The voltage source 48 may have two terminals 50, 52 connected by respective wires 54, 56 to the respective binding posts 40, 46.

Figure 5:
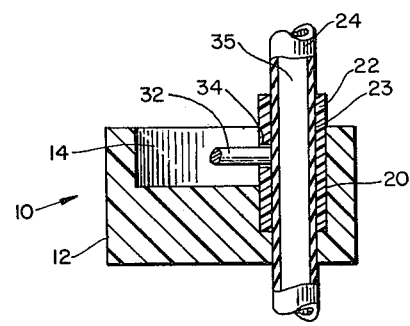
FIG. 5 is a cross sectional view similar to FIG. 2, showing the valve in open position.

FIG. 2 shows the finger 32 extending into the hole 34 of the sleeve 22 compressing the tube 24 laterally. The wire 38 is tensioned and taut when it is cold or unheated so that the shaft 28 is stationary but biased clockwise as viewed in FIG. 1. When a voltage is applied to the circuit including the wires 38 and 44, the wire 38 heats up and expands lengthwise. As the wire 38 increases in slackness, the tube 24 expands laterally as shown in FIG. 5 to push the finger 32 out of the passage 23 in the sleeve 22. The tip of the finger 32 remains in the hole 34.

The elasticity of the tube 24 serves as a spring means to open the passage 32 when the inward pressure of the finger 32 is relaxed. If desired, it is possible to provide an auxiliary spring means to assist the tube 24 in opening the passage 23. This may be a leaf spring 58 as shown in FIGS. 1 and 3 anchored on a pin 60 in the recess 14. One end of the spring 58 bears against a wall of the recess 14 and the other end bears against the arm 26 and tends to rotate it counterclockwise as viewed in FIG. 1. When the wire 38 is cooled and fully contracted and tensioned, the arm 26 is subject to a counterclockwise bias of both the laterally contracted tube 24 and the compressed spring 58. When the wire 38 is heated and slackens, the spring 58 and the tube 24 cooperate in moving the finger 32 out of the passage 23 in the sleeve 22. It will be apparent that the passage 23 is opened and is closed in proportion to the voltage applied to the electrical resistance heater wire 38, since the wire heats up and expands or contracts lengthwise in proportion to the applied voltage.

Figure 6:
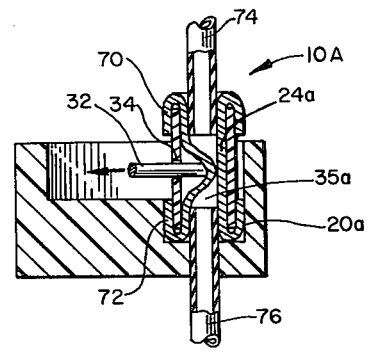
FIG. 6 is a cross sectional view similar to FIG. 2 showing parts of another valve assembly embodying another form of the invention.
Figure 7:
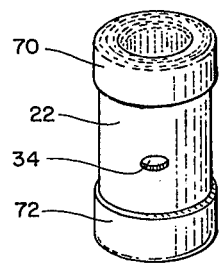
FIG. 7 is a perspective view of a valve member employed in the valve of FIG. 6.
Figure 9:
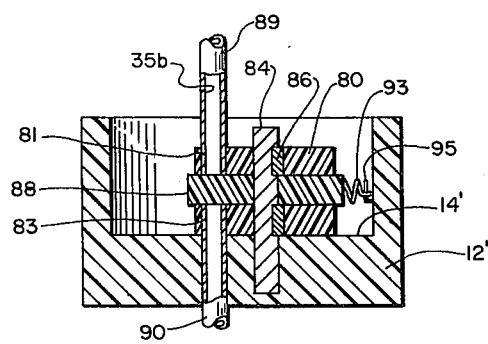
FIG. 9 is an enlarged cross sectional view taken along line 9—9 of FIG. 8.

FIGS. 6 and 7 show another form of the invention in which a valve assembly generally designated as reference numeral 10A has a short elastic tube 24a extending axially through the sleeve 22. Opposite ends 70, 72 of the tube 24a are folded over and are frictionally engaged on the outside of the sleeve 22 as illustrated in FIG. 9. A bore 20 engages the lower end of the sleeve 22 and the folded tube end 72. Two rigid pipes or tubes 74, 76 are engaged in opposite ends of the sleeve 22 inside of tube 24a. This provides a passage 35a for fluid flowing therethrough between the bues 74, 76. The finger 32 operates in the same way as described above to constrict a passage 35a when the wire 38 is taut. When the wire 38 is electrically heated and slack, the finger 32 is retracted from the passage 35a, as the tube 24a expands laterally. Other parts of valve assembly 10A are identical to those shown in FIGS. 1–5.

Figure 8:
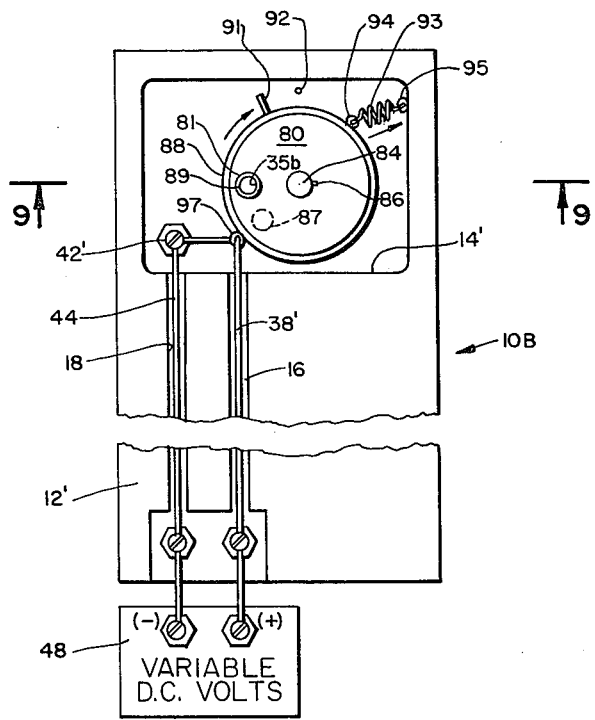
FIG. 8 is a plan view with parts broken away, showing a further valve assembly embodying a further form of the invention.
Figure 10:
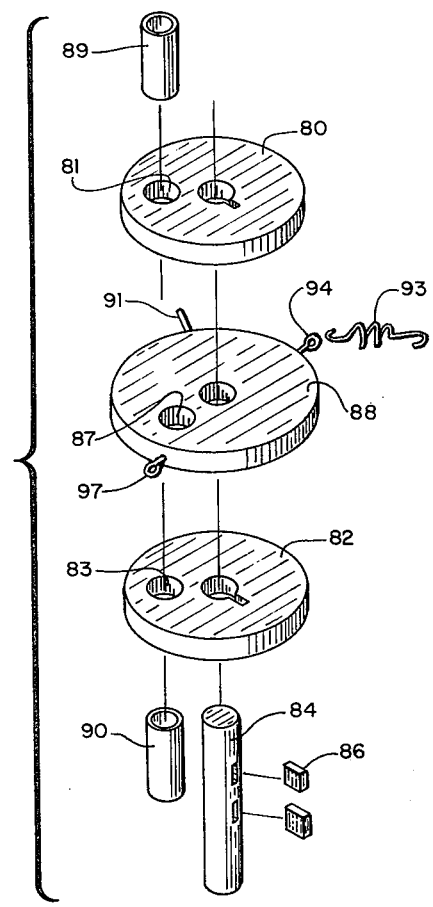
FIG. 10 is an exploded perspective view of parts of the valve of FIG. 8.

In FIGS. 8, 9 and 10, is shown another valve assembly generally designated as reference numeral 10B embodying another form of the invention. In this valve assembly there are two flat disks 80, 82 secured to a post 84 by a respective key 86. Rotatably disposed between the disks 80, 82 is a third disk 88. The disks 80, 82 have aligned apertures 81, 83 within which are secured aligned pipes or tubes 89, 90 defining a passage 35b for conducting a fluid. The disk 88 has an aperture 87 which may be aligned with the apertures 81, 83. A pin 91 extends radially from the disk 88 and contacts a stop pin 92 fixed in a recess 14' when the aperture 87 is aligned with the apertures 81, 83 (see FIG. 8). A coil spring 93 is secured between an eye 94 at the periphery of the disk 88 and a pin 95 fixed to the wall of the recess 14' in a plate 12'. One end of an electrical resistance heater 38' is engaged with a hook or an eye 97 at the periphery of the disk 88 and the other end is secured to a screw 42'. When the wire 38' is cool and taut, it holds the disk 88 in a position where the aperture 87 is out of alignment with the apertures 81, 83 as shown in FIG. 8. The wire 38' is in circuit with the wire 44 and the variable voltage source 48. When the electrical resistance heater wire conducts current, it heats up, expands and slackens and the spring 93 turns the disk 88 clockwise, as viewed in FIG. 8, until the aperture 87 aligns with the apertures 81, 83. At this point the pin 91 contacts the stop pin 92. The amount by which the disk 88 turns angularly depends on the extent to which the wire 38' slackens. Thus the aperture 87 partially or fully aligns with the apertures 81, 83 depending on the magnitude of the applied voltage.

In all forms of the invention, proportionate closure or opening of a passage for fluid in a valve depends on the amount by which a taut electrical resistance heater expands, lengthwise and slackens as it conducts electric current. The variable slackening of the wire permits a spring member to turn a movable valve element which in turn opens or closes the passage in the valve. Although the electric current illustrated and described in the specification has been variable D.C., it could just as easily be A.C.

It should be understood that the foregoing relates to only a limited number of preferred embodiments of the invention, which have been by way of example only and that it is intended to cover all changes and modifications of the examples of the invention herein chosen for the purposes of the disclosure, which do not constitute departures from the spirit and scope of the invention.

The invention claimed is:

1. A valve assembly having a passage therethrough for passing a fluid comprising:
   a support;
   a sleeve carried by said support defining said passage for said fluid, said sleeve having a lateral hole;
   a pivotal arm adjacent said sleeve having a finger inserted in said lateral hole for variably constricting said passage between closed and fully open positions;
   an elastic tube operably associated with said pivotal arm and arranged to move said arm for variable opening of said passage, said tube extending through and lining said sleeve and contacting said finger the opposite ends of said tube respectively folded over the outer periphery of said sleeve on respective opposite ends thereof;
   an expansible, electrical resistance heater wire connected to said pivotal arm and to said support in a stretched normally taut position; and
   a circuit means cconnected to said wire for passing an electric current therethrough to heat, expand and thereby slacken said wire, so that said elastic tube moves said pivotal arm to open said passage in proportion to the magnitude of said current heating and expanding said wire.

2. A valve assembly as defined in claim 1, wherein said elastic tube further comprises a spring carried by said support and engaging said pivotal arm to assist said elastic tube in variable opening said passage when said wire expands lengthwise and slackens.

3. A valve assembly as defined in claim 2, wherein said tube is short, with opposite ends engaged on opposite ends of said sleeve.

* * * * *